UNITED STATES PATENT OFFICE.

STUART W. CRAMER, OF CHARLOTTE, NORTH CAROLINA.

CHEWING-GUM.

1,298,670. Specification of Letters Patent. Patented Apr. 1, 1919.

No Drawing. Application filed June 11, 1915. Serial No. 33,494

*To all whom it may concern:*

Be it known that I, STUART W. CRAMER, a citizen of the United States, and a resident of Charlotte, county of Mecklenburg, and State of North Carolina, have invented certain new and useful Improvements in Chewing-Gum, of which the following is a specification.

My invention consists in an improved chewing gum having incorporated therein certain pharmaceutical preparations for the purpose of giving stimulating effects to the user of the gums.

It is well known that many pharmaceutical preparations of stimulating nature designed to invigorate and relieve fatigue are dispensed in various kinds of beverages. Those beverages are necessarily made pleasant and palatable to the taste by the presence of syrups and flavors of an agreeable nature, many of which produce derangements of the digestive organs, particularly when the person drinking them is exhausted and overheated.

I have found that by incorporating the stimulating pharmaceutical preparation in chewing gum, that not only is the desired effect obtained by the user of the chewing gum, but that this effect is accomplished with the least possible derangement of the digestive system. I have found further that when the preparation is embodied or mixed in the chewing gum, it is very gradually released when the gum is chewed. It therefore enters the stomach and intestinal tractus either in the form of a solution in saliva and secretions of the mouth or in a very finely divided condition; in either case it is in the most favorable condition for absorption in the system.

To this end, I incorporate the preparation either directly in the chewing gum by the usual well known processes now used to sweeten or flavor chewing gum or else in a coating for the gum which coating may consist of the usual candy preparation. The coating may be of any suitable material used for this purpose other than candy.

The physical and chemical properties of caffein are such that when it is held in the mouth, it is partially absorbed through the membranes thereof into the human system.

As an example therefore of my invention, I use in combination with the chewing gum, or with the coating thereof, a preparation of caffein such as a citrate of caffein in such amount as to supply to each packet of chewing gum a stimulating effect upon the user thereof equal to that given by one cup of good coffee. The gum may also contain substances which will increase the solubility of the active product and will improve the flavor and taste of the gum.

While citrate of caffein is cited as an illustration of a preparation or derivative of caffein, I do not desire to have it understood that I limit myself to this single derivative, as any derivative of caffein may also be used such as caffeole or caffeone.

It is obvious that the packet of gum above specified may contain a single piece of gum or several small pieces of gum, as is the customary practice in this art. It is well known that cups of coffee are served in varying sizes, from large cups to the demi-tasse, and it is to be understood therefore that it is within the province of my invention to incorporate into the gum to be used the amount of caffein which is present in any good cup of coffee, as so defined.

What I claim as new and desire to secure by Letters Patent, is:

1. A chewing gum having incorporated therein caffein in such an amount that pieces of said gum suitable for chewing will each contain an amount of caffein sufficient to produce approximately the bracing effect equal to that obtained from a cup of coffee.

2. A chewing gum having incorporated therein citrate of caffein.

3. A chewing gum having incorporated therein caffein.

In witness whereof I have hereunto set my hand at New York, county of New York and State of New York, this 10th day of June, 1915.

STUART W. CRAMER.

In presence of—
JOHN J. RANAGAN,
ETHEL D. BARON.